(12) United States Patent
Amo

(10) Patent No.: US 11,256,917 B2
(45) Date of Patent: Feb. 22, 2022

(54) MOVING BODY FOR TRACKING AND LOCATING A TARGET

(71) Applicant: Nidec Corporation, Kyoto (JP)

(72) Inventor: Mitsuhiro Amo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 30 days.

(21) Appl. No.: 16/477,266

(22) PCT Filed: Mar. 13, 2018

(86) PCT No.: PCT/JP2018/009676
§ 371 (c)(1),
(2) Date: Jul. 11, 2019

(87) PCT Pub. No.: WO2018/180454
PCT Pub. Date: Oct. 4, 2018

(65) Prior Publication Data
US 2020/0380699 A1 Dec. 3, 2020

(30) Foreign Application Priority Data
Mar. 28, 2017 (JP) .............................. JP2017-063176

(51) Int. Cl.
*G06K 9/00* (2006.01)
*G05D 1/00* (2006.01)
(Continued)

(52) U.S. Cl.
CPC ....... *G06K 9/00664* (2013.01); *G05D 1/0094* (2013.01); *G05D 1/02* (2013.01);
(Continued)

(58) Field of Classification Search
CPC ....... G06K 9/00664; G05D 1/02–0297; G05D 1/0094; G06T 7/70; G06T 7/292; H04W 64/00; G01S 17/66
See application file for complete search history.

(56) References Cited

U.S. PATENT DOCUMENTS

| 2004/0073368 A1 | 4/2004 | Gonzalez-Banos et al. |
| 2005/0216124 A1* | 9/2005 | Suzuki ................. G05D 1/0272 700/253 |

(Continued)

FOREIGN PATENT DOCUMENTS

| JP | 2005-199377 A | 7/2005 |
| JP | 2009-020749 A | 1/2009 |

(Continued)

OTHER PUBLICATIONS

Yang et al., "Real-Time Specified Person Tracking Using Multiple Active Cameras", School of Industry Science, Graduate School of Osaka University, 6 pages.

(Continued)

*Primary Examiner* — Casey L Kretzer
(74) *Attorney, Agent, or Firm* — Keating & Bennett

(57) ABSTRACT

A moving body tracks a target in conjunction with at least one sensing device. The moving body includes a sensor, a communication device, a processor, and a memory in which a computer program is stored. The processor executes the computer program to calculate a position of the target by analyzing an output of the sensor, estimate a region in which the target is present using a last position of the target calculated when sight of the target is lost or a position obtained by analyzing the output of the sensor after losing the sight of the target, and a movement history of the target or its own device until the sight of the target is lost, and instruct the at least one sensing device selected according to the region to receive a result of the search from the sensing device.

14 Claims, 10 Drawing Sheets

(51) Int. Cl.
*G06T 7/70* (2017.01)
*G05D 1/02* (2020.01)
*G01S 17/66* (2006.01)
*G06T 7/292* (2017.01)

(52) U.S. Cl.
CPC .............. *G06T 7/70* (2017.01); *G01S 17/66* (2013.01); *G06T 7/292* (2017.01)

(56) References Cited

U.S. PATENT DOCUMENTS

| | | |
|---|---|---|
| 2006/0293793 A1 | 12/2006 | Tamura |
| 2009/0052740 A1 | 2/2009 | Sonoura |
| 2012/0316680 A1* | 12/2012 | Olivier, III ........... G05D 1/0246 700/258 |
| 2015/0205301 A1 | 7/2015 | Gilmore et al. |
| 2018/0204335 A1 | 7/2018 | Agata et al. |
| 2020/0312109 A1* | 10/2020 | Shionozaki ............ G08B 25/10 |

FOREIGN PATENT DOCUMENTS

| | | |
|---|---|---|
| JP | 2012-078950 A | 4/2012 |
| JP | 2016-119626 A | 6/2016 |
| WO | 2017/047688 A1 | 3/2017 |

OTHER PUBLICATIONS

Official Communication issued in International Patent Application No. PCT/JP2018/009676, dated May 22, 2018.

* cited by examiner

MOVING BODY FOR TRACKING AND LOCATING A TARGET

CROSS REFERENCE TO RELATED APPLICATIONS

This is the U.S. national stage of PCT Application No. PCT/JP2018/009676, filed on Mar. 13, 2018, and priority under 35 U.S.C. § 119(a) and 35 U.S.C. § 365(b) is claimed from Japanese Application No. 2017-063176, filed Mar. 28, 2017; the entire contents of each application being hereby incorporated herein by reference.

FIELD OF THE INVENTION

The present disclosure relates to a moving body.

BACKGROUND

A technique known in which a moving body traces an object such as a person. One example of the moving body is a robot such as an automated guided vehicle (AGV).

When a moving body loses sight of an object while tracking the object, the moving body is required to search for and re-find the object to resume the tracking. For example, in a related art, an object is found again by performing communication always between a plurality of sensors and robots to share sensor information, position information of each robot, or the like with each other. Also, in other related art, an object is tracked using surveillance cameras on the ground in a normal case, but when sight of the object is lost, the object is detected from images captured by cameras by flying a flying device equipped with the cameras. Further, there is also a related art in which a plurality of cameras are installed, and when sight of an object is lost, information exchange is performed between cameras to predict a region in which the object exists.

In the above-described technique, there is a need to always communicate between moving bodies and/or cameras when sight of an object being tracked is lost, thereby increasing communication loads and processing loads of information acquired by the communication. In a related art, a load applied to a system becomes greater as the number of linked cameras or sensors increases. In doing so, there is a possibility that processing may not catch up.

In the case of introducing flying devices, in addition to requiring introduction costs, an object may not be re-found at a place where the flying device cannot fly.

Assuming that automated guided vehicles (AGVs) track a person or the like at a factory, it is necessary to design and develop a system predicting the increase in communication loads and processing loads described above in consideration of the situation in which infrastructures are used in common with other devices. Thus, costs for installation and maintenance may be increased.

SUMMARY

Example embodiments of the present disclosure provide a moving body capable of reducing costs for communication, processing, and/or purchase of equipment, and a moving body system including the moving body.

According to an example embodiment of the present disclosure, there is provided a moving body that tracks a target in conjunction with at least one sensing device in an indoor place and/or an outdoor place in which the at least one sensing device is present. The moving body includes a sensor that senses the target, a communication device, a processor, and a memory storing a computer program. The processor executes the computer program to calculate a position of the target by analyzing an output of the sensor, estimates a region in which the target is present using a last position of the target calculated when sight of the target is lost or a position obtained by analyzing the output of the sensor after losing the sight of the target, and a movement history of the target or its own device until the sight of the target is lost, instructs at least one sensing device selected according to the region to search for the target through the communication device, and receives a result of the search by the sensing device through the communication device.

According to an example embodiment of the present disclosure, when a moving body loses sight of a target that is a tracked object, the moving body transmits a search request to other sensing devices and uses some of the other sensing devices to search for the missing target. Communication loads and processing loads are able to be reduced or minimized by tracking the target in connection with the other sensing devices. Further, since it is not necessary to introduce a dedicated flying device or the like for searching for a lost target, costs required for purchasing such equipment and the like are able to be reduced.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 8A is a flowchart illustrating a procedure of processing of a microcomputer 14a.

FIG. 8B is a flowchart illustrating the procedure of the processing of the microcomputer 14a.

DETAILED DESCRIPTION

Hereinafter, example embodiments according to the present disclosure will be described with reference to the accompanying drawings. In the present specification, an automated guided vehicle will be taken as one example of a moving body. As described above, the automated guided vehicle is also referred to as an "AGV", and is also described as "AGV" in the present specification. Further, it is not essential that the AGV has a function of carrying things. Mobile robots that carry nothing are also within the scope of the AGV in the present specification. Further, although a truck type AGV having four wheels is illustrated in the present specification, the number and shapes of the wheels are arbitrary. The AGV may be, for example, a bicycle type having two wheels, or a circular shape having three or more wheels.

Figure 1:
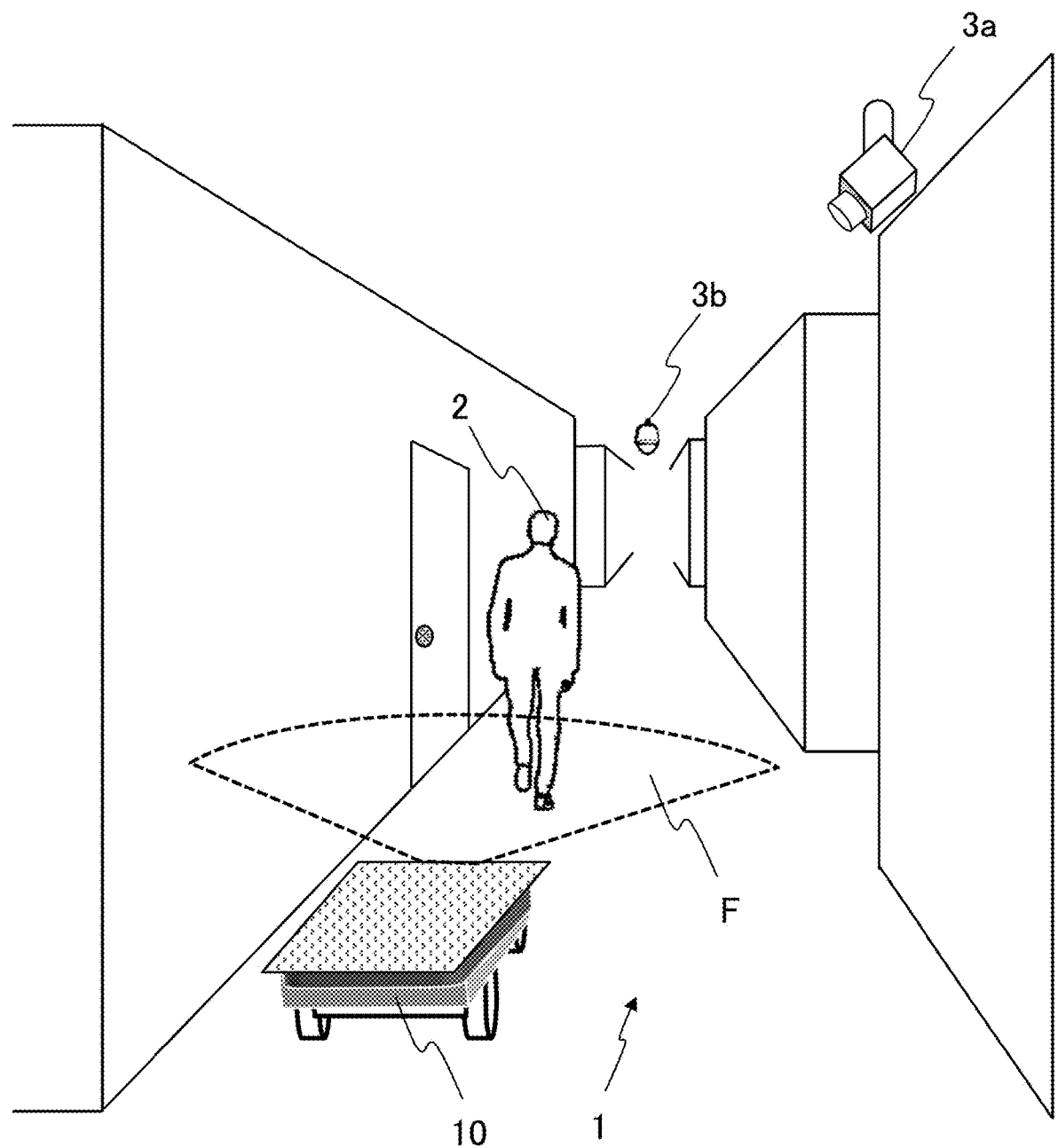
FIG. 1 is a view illustrating an automated guided vehicle (AGV) (10) that tracks a person 2 that walks in a passage 1.

FIG. 1 illustrates an AGV 10 that tracks a person 2 that walks a passage 1. The purpose of tracking the person 2 by the AGV 10 is, for example, to carry a package of the person 2 or to monitor the person 2 that is determined to be a suspicious person.

The AGV 10 moves by driving each of a plurality of motors built therein to rotate wheels. The AGV 10 is provided with a depth camera to be described below. The AGV 10 places the person 2 in a field of view F of the depth camera to measure a distance from the AGV 10 to the person 2. Further, the AGV 10 calculates a position, a traveling direction, and a moving speed of the person 2 from the distance and images of the person 2 acquired by the depth camera to track the person 2.

In order to recognize the person 2 in the image, the AGV 10 has feature values of the person 2. The feature value is, for example, a three-dimensional shape on the basis of a plurality of feature points representing an outline (edge) of the person 2 on the image, the color of clothes of the person 2, and a distance to each part of a body of the person 2.

In the passage 1, a plurality of cameras 3a and 3b are installed. In FIG. 1, the cameras 3a and 3b are fixedly installed on a ceiling of the passage 1, but may be installed on wall surfaces. In the passage 1, other AGVs (not shown) having the same configuration and function as those of the AGV 10 is also traveling. Cameras mounted on the other AGVs are different from the cameras fixedly installed and may operate as a movable camera.

Figure 2:
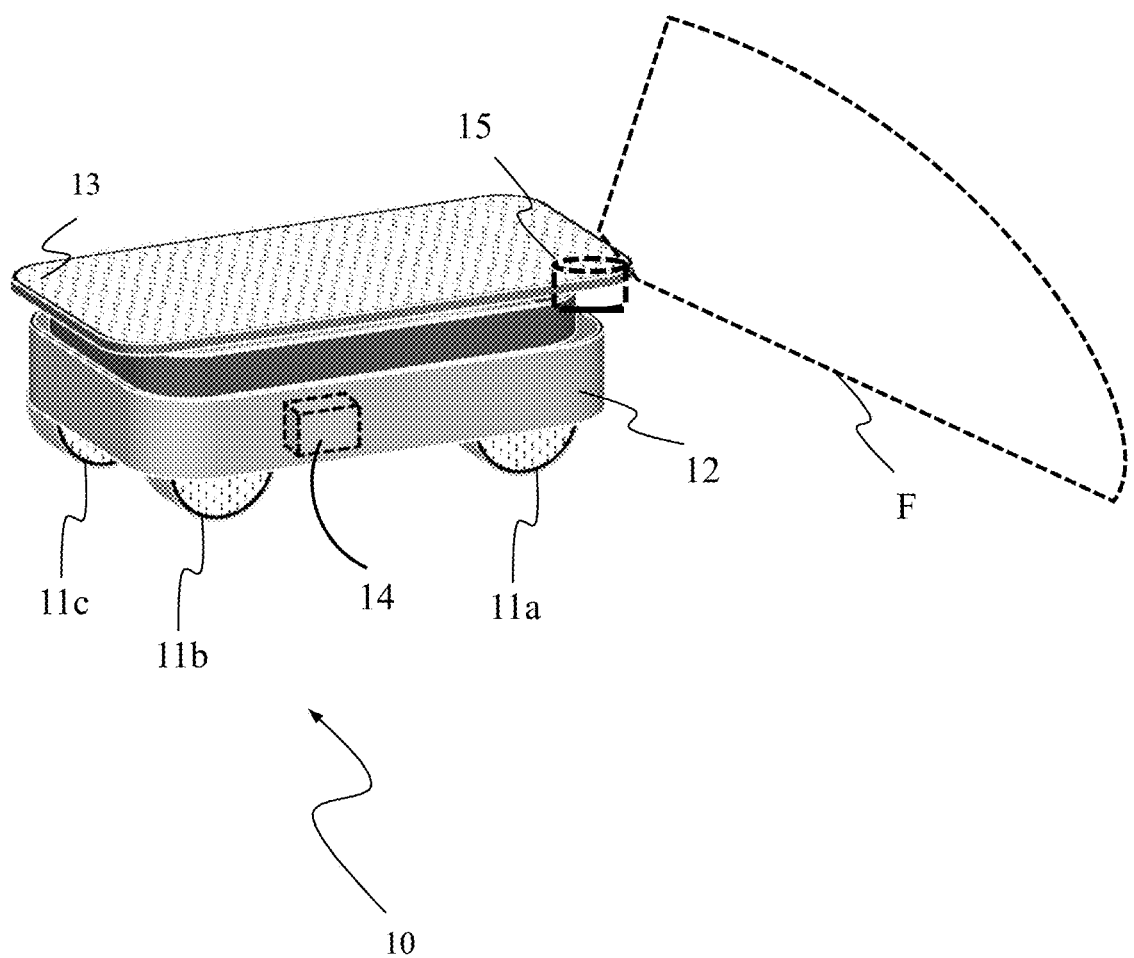
FIG. 2 is an external view of an AGV 10 according to an example embodiment of the present disclosure.
Figure 3:
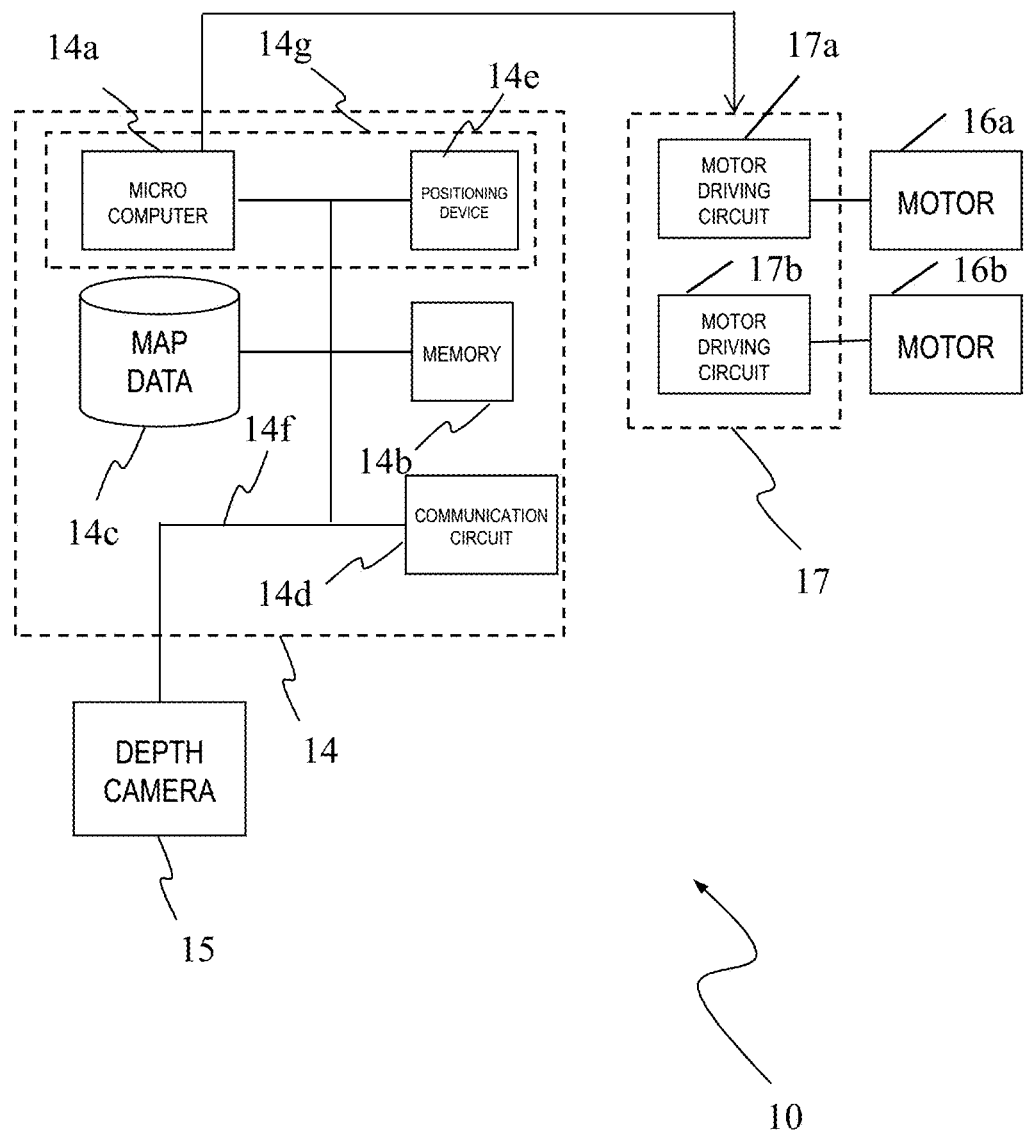
FIG. 3 is a view illustrating a hardware configuration of the AGV 10.

FIG. 2 is an external view of an AGV 10 according to an example embodiment of the present disclosure. Further, FIG. 3 illustrates a hardware configuration of the AGV 10.

The AGV 10 includes four wheels 11a to 11d, a frame 12, a conveying table 13, a travel control device 14, and a depth camera 15. Meanwhile, in FIG. 5, a front wheel 11a and rear wheels 11b and 11c are shown, but a front wheel 11d is not shown because it is hidden by the frame 12.

The travel control device 14 is a device that controls an operation of the AGV 10. The travel control device 14 mainly includes a plurality of integrated circuits including a microcomputer (to be described below), a plurality of electronic components, and a circuit board on which the plurality of integrated circuits and the plurality of electronic components are mounted.

The depth camera 15 has a function of measuring distances (depth) to objects in addition to a general function of capturing moving images and/or still images. The depth camera 15 includes image sensors (not shown), and may acquire the still image from the image sensors by receiving light of a field of view F. A set of still images continuously acquired at certain time intervals is the moving image. Since techniques for acquiring moving and still images are well known, the further detailed description thereof will be omitted. Hereinafter, the moving images and the still images are collectively referred to as "images". Examples of the object that may be detected by the depth camera 15 are people, baggage, shelves, or walls.

The depth camera 15 measures the depth by, for example, a time of flight (TOF) method. The TOF method is a method of measuring the distance from the depth camera 15 to the object from a time period in which light reciprocates between the depth camera 15 and the object. The TOF-type depth camera 15 emits, for example, pulsed infrared light, and the sensor receives the infrared light reflected by the object. The depth camera 15 detects a difference (a phase difference) between a phase of the emitted infrared light and a phase of the received reflected light, converts the phase difference into a time difference, and calculates a product of the time difference and light speed. The calculation result represents a reciprocating distance between the depth camera 15 and the object. Thus, the depth camera 15 may measure a one-way distance from the camera to the object in real time. Since the structure and operation principle of the depth camera 15 are known, the more detailed description thereof will be omitted in the present specification.

The AGV 10 may obtain an arrangement of the objects around the AGV 10 based on a position and a posture of the AGV 10 and the images acquired by the depth camera 15. Generally, the position and the posture of the moving body are referred to as a "pose". The position and the posture of the moving body in a two-dimensional plane are expressed by position coordinates (x, y) in an XY orthogonal coordinate system and an angle θ with respect to an X-axis. The position and the posture of the AGV 10, that is, the pose (x, y, θ) may be hereinafter simply referred to as a "position".

A positioning device to be described below may identify a self-position (x, y, θ) on an environmental map by comparing (matching) local map data generated from the image and distance data acquired using the depth camera 15 and a wider range of environmental map data. The "wider range of environmental map data" is prepared in advance and stored as map data in a storage device 14c.

The depth camera 15 is an example of an external sensor configured to sense surrounding space to acquire sensor data. A laser range finder and an ultrasonic sensor are also an example of such an external sensor. In the present example embodiment, the depth camera 15 is merely an example of a device used to measure a distance from the AGV 10 to a person 2. A two-eye camera may be used instead of the depth camera 15.

The AGV 10 may operate in combination with the various sensors described above. For example, the AGV 10 may scan the surrounding space with the laser range finder and measure the presence of the surrounding object and the distance to the object. Further, the AGV 10 may acquire the images with a camera which does not acquire depth information. The AGV 10 may estimate the self-position by combining the data output from the laser range finder and the image data output from the camera. The AGV 10 may include a separate depth camera 15 to track a "target" to be described below. Alternatively, when the distance information output from the laser range finder and the image data output from the camera are used, the depth camera 15 and the twin-eye camera may be omitted. In the present specification, the external sensor may be referred to as a "sensing device," and data output from the external sensor may be referred to as "sensor data".

Further, in FIGS. 1 and 2, the field of view F is illustrated as being parallel to a floor surface on which the AGV 10 travels, but it should be rioted that the field of view F is actually expanded in a direction perpendicular to the floor surface.

The "sensor data" output from the depth camera 15 includes the image and distance data. The distance may be measured for each pixel of the image. The distance to the person 2 may be obtained as, for example, an average value of the distances to each pixel forming a shape of the person 2 in the image.

FIG. 3 is referred to. A detailed configuration of the travel control device 14 of the AGV 10 is shown in FIG. 3.

The AGV 10 includes the travel control device 14, the depth camera 15, two motors 16a and 16b, and a driving device 17.

The travel control device 14 includes a microcomputer 14a, a memory 14b, the storage device 14c, a communication circuit 14d, and a positioning device 14e. The microcomputer 14a, the memory 14b, the storage device 14c, the communication circuit 14d, and the positioning device 14e are connected by a communication bus 14f and may transmit and receive data to/from each other. The depth camera 15 is also connected to the communication bus 14f through a communication interface (not shown), and transmits measurement data that is a measurement result to the microcomputer 14a, the positioning device 14e, and/or the memory 14b.

The microcomputer 14a is a processor or a control circuit (computer) that performs calculations for controlling the entire AGV 10 including the travel control device 14. Typically, the microcomputer 14a is a semiconductor integrated circuit. The microcomputer 14a transmits pulse width modulation (PWM) signals to the driving device 17 to control the driving device 17 and adjust current flowing to the motors. Thus, each of the motors 16a and 16b rotates at a desired rotational speed.

The memory 14b is a volatile storage device that stores computer programs executed by the microcomputer 14a. The memory 14b may also be used as a work memory when the microcomputer 14a and the positioning device 14e perform calculations.

The storage device 14c is a non-volatile semiconductor memory device that stores map data. However, the storage device 14c may be a magnetic recording medium represented by a hard disk, or an optical recording medium represented by an optical disk. Further, the storage device 14c may include a head device for writing and/or reading data to or from any recording medium and a control device of the head device.

The communication circuit 14d is a wireless communication circuit that performs wireless communication in compliance with, for example, a Bluetooth (registered trademark) standard and/or a Wi-Fi (registered trademark) standard. All the standards include a wireless communication standard using frequencies in the 2.4 GHz band.

The positioning device 14e receives the sensor data from the depth camera 15 and reads the map data stored in the storage device 14c. The positioning device 14e may perform processing of comparing the sensor data and the map data to identify the self-position. The detailed operation of the positioning device 14e will be described below.

Further, although the microcomputer 14a and the positioning device 14e are separate components in the present example embodiment, this is merely an example. It may be a circuit of a single chip or a semiconductor integrated circuit capable of independently performing each operation of the microcomputer 14a and the positioning device 14e. In FIG. 3, a chip circuit 14g including the microcomputer 14a and the positioning device 14e is shown. In the present specification, there is a case in which the microcomputer 14a, the positioning device 14e, and/or the chip circuit 14g may be referred to as a "computer" or a "processing circuit". Further, hereinafter, an example will be described in which the microcomputer 14a and the positioning device 14e are installed separately and independently.

The two motors 16a and 16b are attached to and rotate the two wheels 11b and 11c, respectively.

The driving device 17 includes motor driving circuits 17a and 17b to adjust the current flowing to each of the two motors 16a and 16b. Each of the motor driving circuits 17a and 17b is a so-called inverter circuit, and turns on or off the current flowing to each motor by the PWM signal transmitted from the microcomputer 14a, thereby adjusting the current flowing to the motor.

The AGV 10 is instructed by an administrator or a travel management device (not shown) to track the person 2. In the present example embodiment, the operation of the AGV 10 when the AGV 10 loses sight of the person 2 while tracking the person 2 will be described, and the operation of other AGVs or cameras existing around the AGV 10 will also be described.

In the following description, when simply referred to as "cameras", the cameras refers to cameras fixedly installed indoors and/or outdoors where the AGV 10 travels. On the other hand, cameras mounted on other AGVs are expressed as "cameras of other AGVs" and the like. The cameras and the cameras of other AGVs are all examples of the "sensing devices".

Further, the object to be tracked is referred to as a "target". In the present example embodiment, the target is the person 2. However, objects that can move such as an animal, another AGV, or the like may be the target.

In the present specification, the term "loses" sight of the target mainly includes two meanings. One is the case in which a shape of the target does not exist on the acquired images. The other one is the case in which, since a plurality of shapes including the shape of the target exist on the acquired image, the microcomputer 14a may not determine a candidate for the target as one.

When the sight of the target is lost, the microcomputer 14a of the AGV 10 determines a region (a search region) including a position where the target is estimated to exist. The microcomputer 14a uses the communication circuit 14d to instruct at least one other AGV or camera, which is selected according to the search region, to search for the target. Other AGVs or the like which have received the instruction search for the target by sensing the surrounding space, and transmit the result of the search to the AGV 10. The microcomputer 14a receives the result of the search, and when the result indicates the presence of the target, moves its own device to the position where the target exists to resume the tracking of the target from the position. On the other hand, when the result of the search indicates the absence of the target, the microcomputer 14a changes the search region and performs the above-described operation again.

In the following description, a process of determining the search region by the microcomputer 14a, a process of selecting at least one other AGV or camera according to the search region, and a process of searching for the target will be described.

Figure 4:
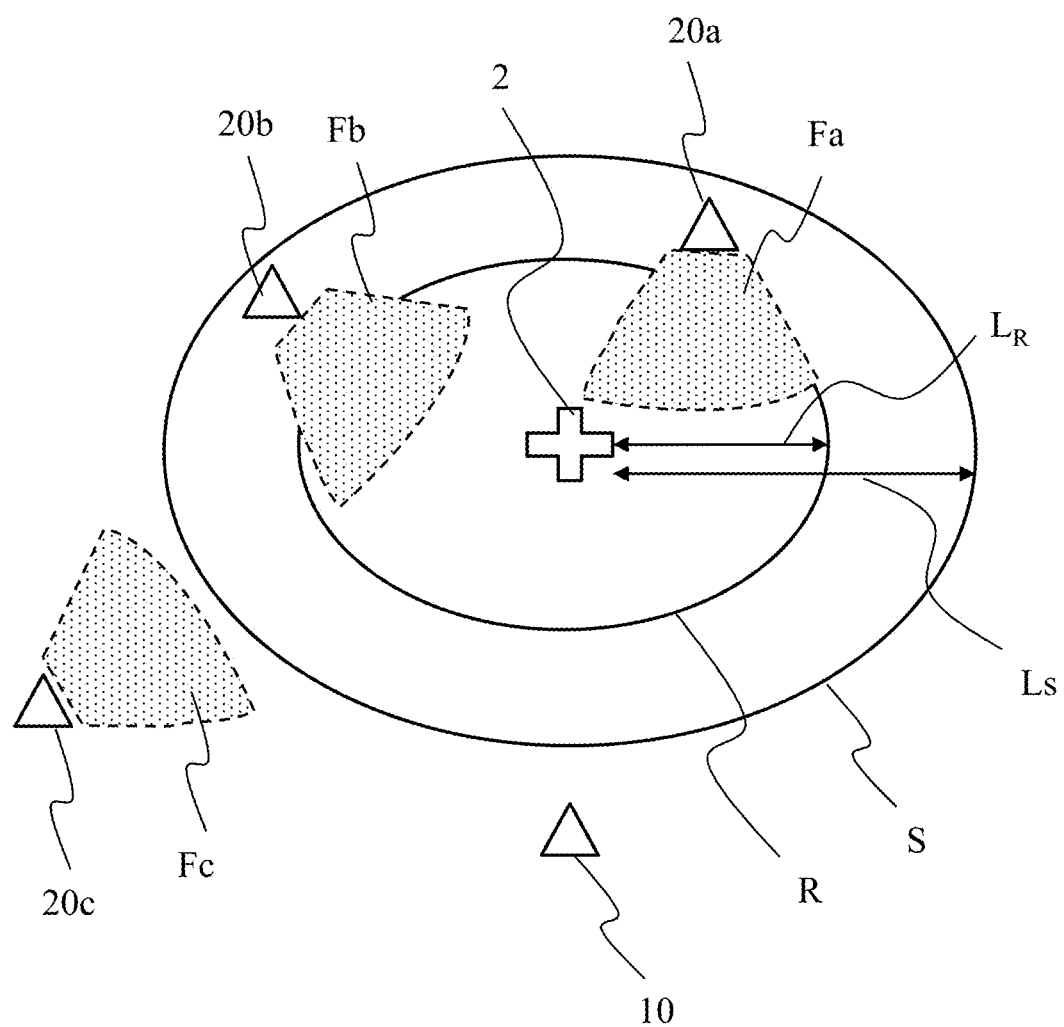
FIG. 4 a view illustrating the relationship between a search range R, a position of the AGV 10, and a position of each of other AGVs 20a to 20c.

FIG. 4 illustrates the relationship between a search range R, the position of the AGV 10, and the position of each of other AGVs 20a to 20c. Further, some or all of the "other AGVs 20a to 20c" may be replaced with the "cameras". For the convenience of explanation, it is assumed that a configuration of each of the AGVs 20a to 20c is the same as that of the AGV 10. Accordingly, each of the AGVs 20a to 20c includes the depth camera 15.

The depth cameras of the AGVs 20a to 20c have fields of views Fa to Fc, respectively. A depth of each of the fields of views Fa to Fc is, for example, in a range of 1 m to 5 m. The reason that the depth is relatively short is that a range of arrival of the infrared light emitted from the depth camera and a resolution for identifying the image of the target in the captured images are taken into consideration. Further, the depth of the field of view is not limited to being represented by an integer value, and may be represented by a decimal value.

In FIG. 4, a position of the person 2 that is the target is indicated by a symbol "+". Until AGV 10 reaches the position of the symbol "+", the AGV 10 identifies the position of the person 2 from the image acquired from the depth camera 15, the distance to the person 2 in the image, and the pose of the AGV 10. Here, it is assumed that the AGV 10 has lost the sight of the person 2 at the position of the symbol "+".

It may be assumed that a speed at which the target moves at the time point in which the sight of the person 2 is lost is equal to a speed V at which the AGV 10 that was tracking the target moves. The AGV 10 may determine the speed V using, for example, rotational speeds of the motors 16a and 16b and radius values of the wheels. When the AGV 10 has a speedometer, the AGV 10 may acquire the speed V using an output value of the speedometer.

Alternatively, the AGV 10 may obtain the speed at which the target moves from a plurality of images captured by the depth camera 15 and a change amount of the distance. The AGV 10 may also obtain the speed at which the person 2 moves by analyzing the plurality of images captured until the sight of the person 2 is lost, and using the difference between the capturing times and the change amount of the positions that may be determined from the images and/or the distances. However, when the AGV 10 is traveling, it is necessary to consider the speed at which the AGV 10 moves.

As is clear from the above description, when the AGV 10 loses the sight of the person 2, the AGV 10 uses information of the speed of movement so far, that is a moving history of the AGV 10 or the target which has been acquired until the sight of the person 2 is lost.

An elapsed time after losing the sight of the target is referred to as "T". A distance at which the target is estimated to have moved after losing the sight of the target, that is, an estimated movement distance $L_R$ is obtained by $L_R=V \cdot T$. That is, a range in which the target can move is estimated to be within a circle of radius $L_R$ around the position of the symbol "+" shown in FIG. 4. The AGV 10 sets a region in the circle as a "search region R".

An AGV capable of acquiring images of the search region R is an AGV existing in an image-capturable region S shown in FIG. 4 among other AGVs 20a to 20c. The image-capturable region S is set to be wider than the search region R. For example, the image-capturable region S may be defined as a circle of radius Ls ($>L_R$) with the position of the symbol "+" as a center thereof. The radius difference (Ls−$L_R$) corresponds to depths of the fields of views of the depth cameras of other AGVs. Other AGVs existing in the image-capturable region S may capture at least a part of the search region R using the depth cameras. In the present example embodiment, the performance capable of capturing the entire search region R is not essential for the depth cameras of other AGVs.

Further, even when other AGVs exist in the image-capturable region S, since the fields of views of the depth cameras of other AGVs do not face a direction of the search region R, in practice, there may be cases in which the search region R may not be captured. However, in the present example embodiment, it is assumed that the AGV 10 tracking the target instructs other AGVs existing in the image-capturable region S to search for the search region R. Meanwhile, as will be described below, since data for specifying the search region R is also transmitted to other AGVs, other AGVs may capture the search region R by moving thereto as necessary.

In the example shown in FIG. 4, other AGVs 20a and 20b are selected according to the estimated search region R. The AGVs 20a and 20b sense the search region R and search for the target. On the other hand, the AGV 20c positioned outside the image-capturable region S is not selected as the AGV for searching for the target in the search region R.

The AGV 10 transmits a search request through the communication circuit 14d. In the present example embodiment, the search request is transmitted to all the other AGVs and cameras. Here, the AGV 10 adds region data specifying the search region R and image-capturable region S to the search request. The region data includes a set of coordinates of the position at which the sight of the person 2 is lost and values of radii $L_R$ and Ls. The "coordinates" may be designated by "absolute coordinates" preset in a space in which the AGV 10 travels.

Each AGV and camera that has received the search request and the region data determines whether its own position is within the image-capturable region S.

In the case of the AGV, the positioning device 14e, which has been described above with respect to the AGV 10, may be used for processing for the determination. Each AGV, which has received the search request, receives the image data from its own depth camera and reads the map data stored in the storage device 14c. The positioning device 14e may perform processing of comparing the image data and the map data to identify the self-position. A microcomputer of each AGV may determine whether the identified self-position is included in the above-described image-capturable region S. Meanwhile, in order to identify the self-position, for example, a sensor such as light detection and ranging (LiDAR), a gyro, a wheel encoder, or the like may be used.

On the other hand, since the camera is fixedly installed, position information may be stored in advance. A microcomputer of each camera may determine whether its own position is included in the above-described image-capturable region S.

When the search region R is estimated by the above-described process, the image-capturable region S is determined, and further, other AGVs 20a and 20b in the image-capturable region S are selected. Other AGVs 20a and 20b capture the search region R indicated by the coordinates of the position at which the sight of the person 2 is lost and the radius $L_R$, determine whether the target exists in the image, and transmit search results to the AGV 10.

In the determination of whether the target exists in the image, the AGV 10 may transmit feature data of the target person 2 that is the target to the AGVs 20a and 20b in advance. The feature data indicates the feature values that the AGV 10 uses to recognize the person 2 in the image. The timing of transmission is arbitrary. For example, when it is determined that its own position is included in the above-described image-capturable region S, each of the AGVs 20a and 20b notifies the AGV 10. The AGV 10 may transmit the feature data in response to the reception of the notification.

Each of other AGVs 20a and 20b performs image processing to determine whether there is a shape completely matching the feature data in the acquired images. Further, the term "matching" also includes the case in which the shape matching the feature data at a predetermined ratio or higher, for example, a ratio of 60% or higher, exists in the acquired images.

According to the above-described processing, communication loads may be reduced since communication is performed to transmit the search request when the sight of the target is lost. Further, since the search region R and the image-capturable region S may be determined by relatively simple calculation, computational loads of the microcomputer is sufficiently low. Further, since the sensing devices, which are selected directly according to the image-capturable region S or selected indirectly according to the search region R, perform the search, all the sensing devices are not always used. Thus, a case also doesn't occur in which the entire resource is inefficiently used every time the search is performed. Further, since it is not necessary to introduce new devices for the above-described processing, introduction costs of the devices, such as flying devices of a related art are also not necessary.

Next, processing for further narrowing the search region R will be described.

Figure 5:
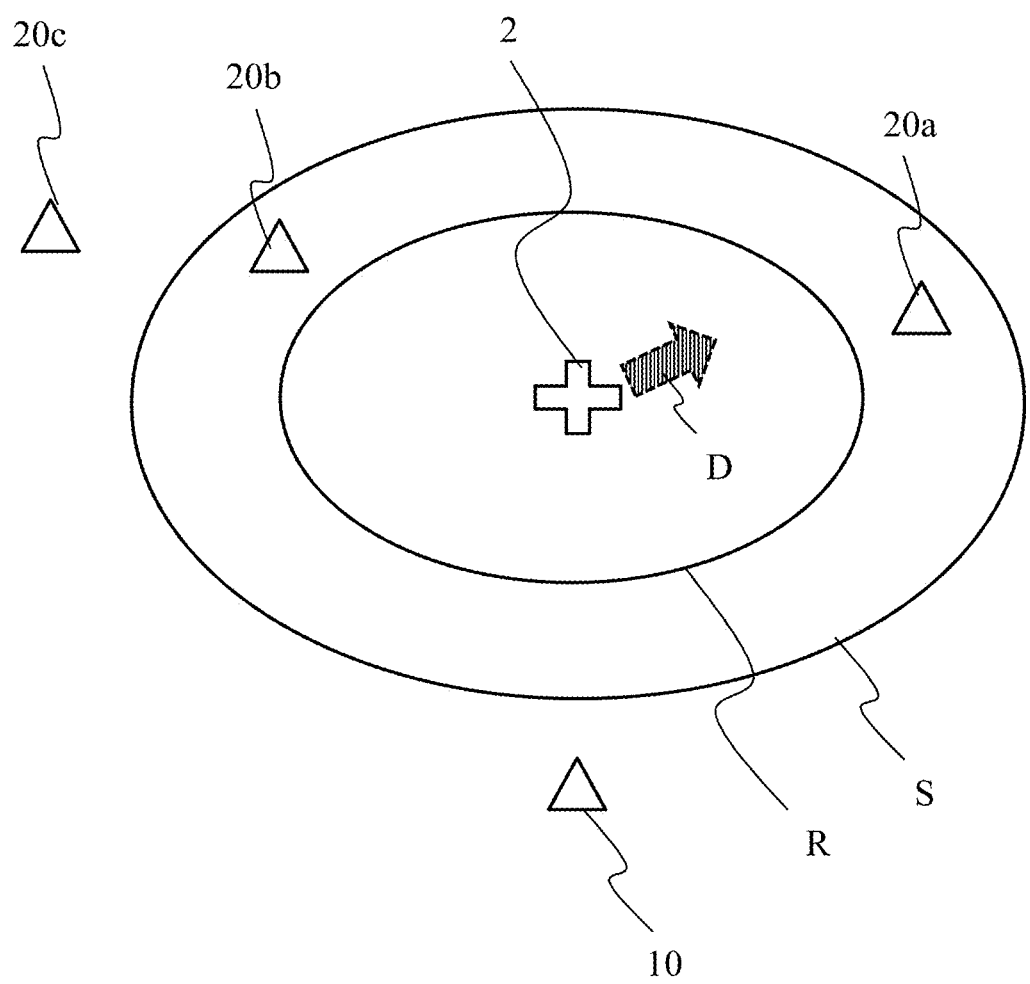
FIG. 5 is a view illustrating a movement direction D of a person 2 that is a target.

FIG. 5 illustrates a movement direction D of the person 2 that is the target. The microcomputer 14a may determine the movement direction D using a plurality of images acquired by the depth camera 15 until the sight of the person 2 is lost. For example, the microcomputer 14a detects a "change" of the shapes of the person 2 in the two images acquired immediately before losing the sight of the person 2. When a position of the shape of the person 2 changes in a direction crossing the image from left to right, it is estimated that person 2 has moved toward a right direction. On the other hand, when the "change" of the shapes of the person 2 does not occur in the direction crossing the image, it is estimated that the person 2 is moving straight ahead or stopped.

The movement direction of the person 2 may be a useful clue for effectively limiting the region in which the person 2 is searched for after losing the sight of the person 2. The microcomputer 14a also limits the image-capturable region S in consideration of the movement direction of the person 2.

Figure 6:
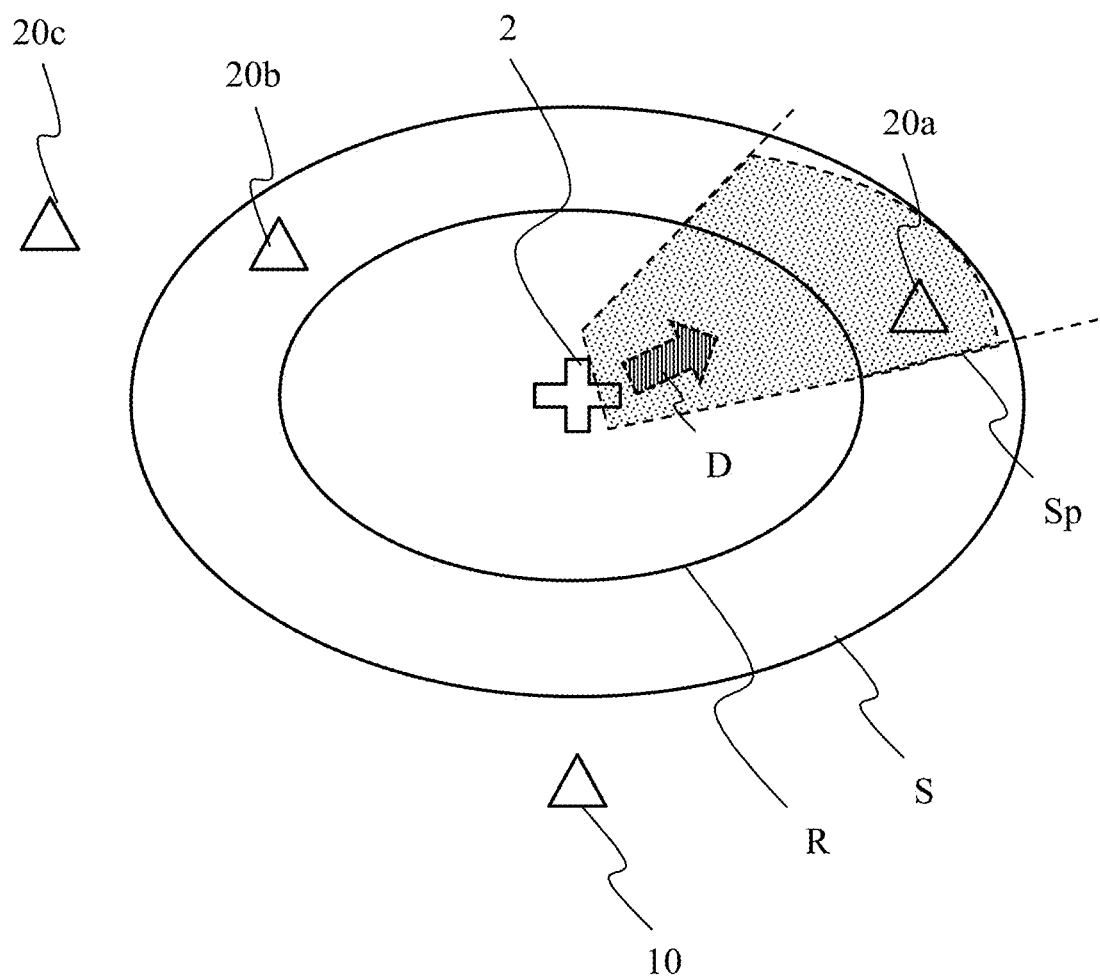
FIG. 6 a view illustrating a partial region Sp of an image-capturable region S determined in consideration of the movement direction D of the person 2.

FIG. 6 illustrates a partial region Sp of the image-capturable region S determined in consideration of the movement direction D of the person 2. The microcomputer 14a determines a region, which has a certain width including the movement direction D of the person 2, in the image-capturable region S as the partial region Sp.

The microcomputer 14a generates data specifying the partial region Sp as the region data. The region data is, for example, a set of values of the coordinates of the position at which the sight of the person 2 is lost and the radius Ls, and certain angle ranges including the movement direction D. Each AGV and camera that has received the search request and the region data may determine whether its own position is within the partial region Sp.

According to the above-described processing, the AGV 20a captures the search region R within a range that can be captured by its own depth camera, and determines whether the target exists in the image. Then, the AGV 20a transmits the search result to the AGV 10.

On the other hand, since another AGV 20b does not exist in the partial region Sp, there is no case in which the AGV 20b operates as the AGV for searching for the person 2.

On the contrary, when the search result by the AGV 20a existing in the partial region Sp indicates the absence of the target, the microcomputer 14a may change the partial region Sp and transmit a new search request and new region data.

As a result of the change, an AGV or a camera different from the AGV 20a may newly perform the search. As a result, another part in the search region R is searched.

The range of the AGV and/or the camera performing the search may be further limited by determining the partial region Sp where the probability of the presence of the person 2 is higher and allowing other AGVs and/or cameras in the partial region Sp to search for the person 2. Thus, more efficient utilization of the sensing device is achieved.

In the above description, the case in which the search region R and the image-capturable region S are on circles with the position at which the sight of the person 2 is lost as a center thereof has been taken as an example to make the process found out by the present inventor easy to understand. Next, a more specific example of FIG. 6 will be described.

Figure 7:
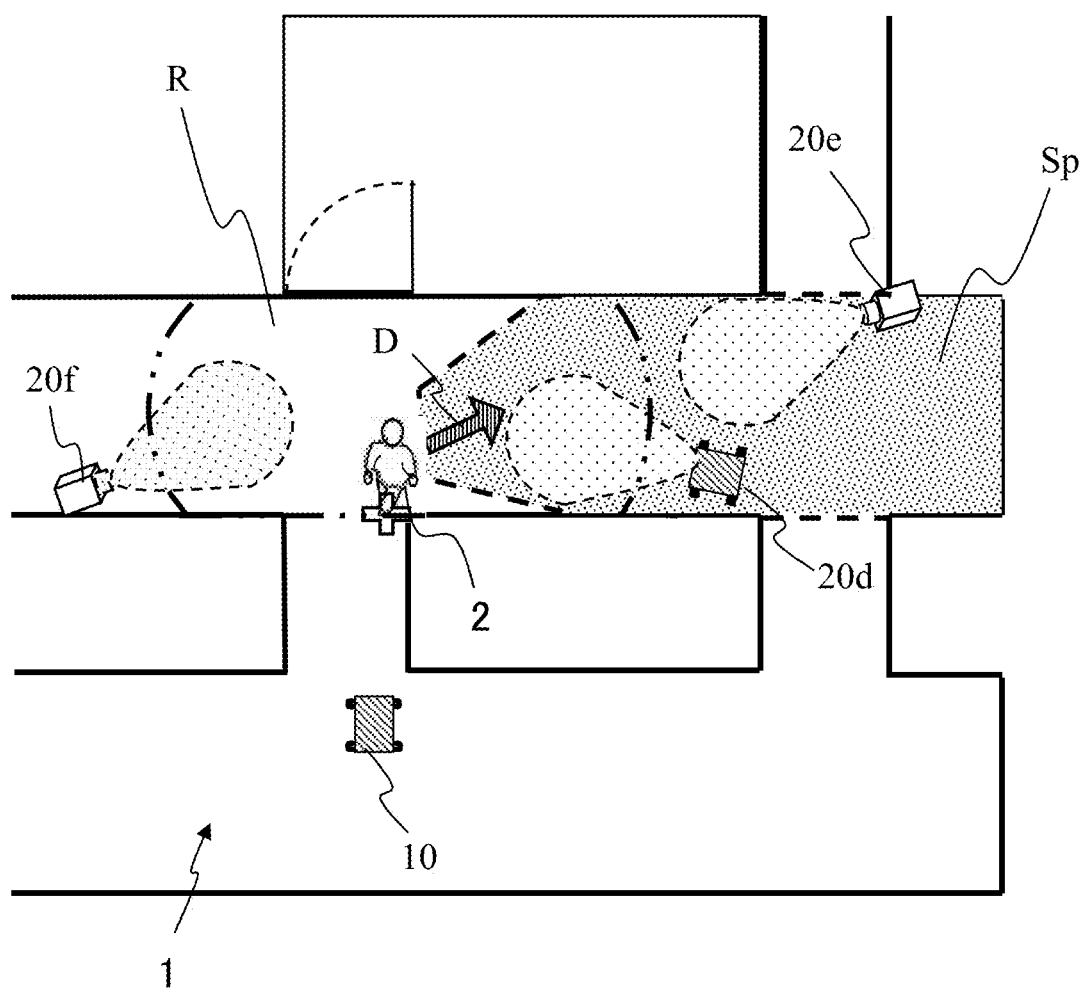
FIG. 7 is a view illustrating one example of an AGV 10 that has lost sight of a person 2 moving in a passage 1, a search region R, and a partial region Sp according to an example embodiment.

FIG. 7 illustrates one example of an AGV 10 that has lost sight of a person 2 moving in a passage 1, a search region R, and a partial region Sp according to an example embodiment. Reference numerals and symbols are the same as in the previous examples.

A microcomputer 14a of the AGV 10 that has lost the sight of the person 2 determines the search region R from a speed at which the person 2 was moving immediately before the sight of the person 2 is lost. The search region R may be defined as a region surrounded by a two-dot chain line and a wall of the passage 1. Further, the microcomputer 14a determines a partial region Sp in consideration of a movement direction D of the person 2. The partial region Sp may be defined as a region surrounded by a dashed line and the wall of the passage 1.

The microcomputer 14a transmits region data specifying the partial region Sp together with a search request of the person 2 to other AGVs and cameras through a communication circuit 14d. Further, the partial region Sp may be specified by a set of values of coordinates of a position at which the sight of the person 2 is lost and a radius Ls, and certain angle ranges including the movement direction D, as described above, or may be specified by a section (zone) preset in the passage 1.

Other AGVs and cameras that have received the search request and the region data determine whether they are positioned in the partial region Sp in the manner described above. In the example of FIG. 7, each of an AGV 20d and a camera 20e determines that each of the AGV 20d and the camera 20e is positioned in the partial region Sp, and senses the search region R to search for a target. On the other hand, a camera 20f positioned outside the partial region Sp does not search for the target in the search region R.

As is clear from the description of the above-described example embodiment, the search region R, an image-capturable region S, and the partial region Sp may be appropriately set according to the passage 1 or the like in which the AGV 10 travels.

Next, an operation of the microcomputer 14a of the AGV 10 that performs the above-described processing will be described with reference to FIGS. 8A and 8B.

Figure 8A:
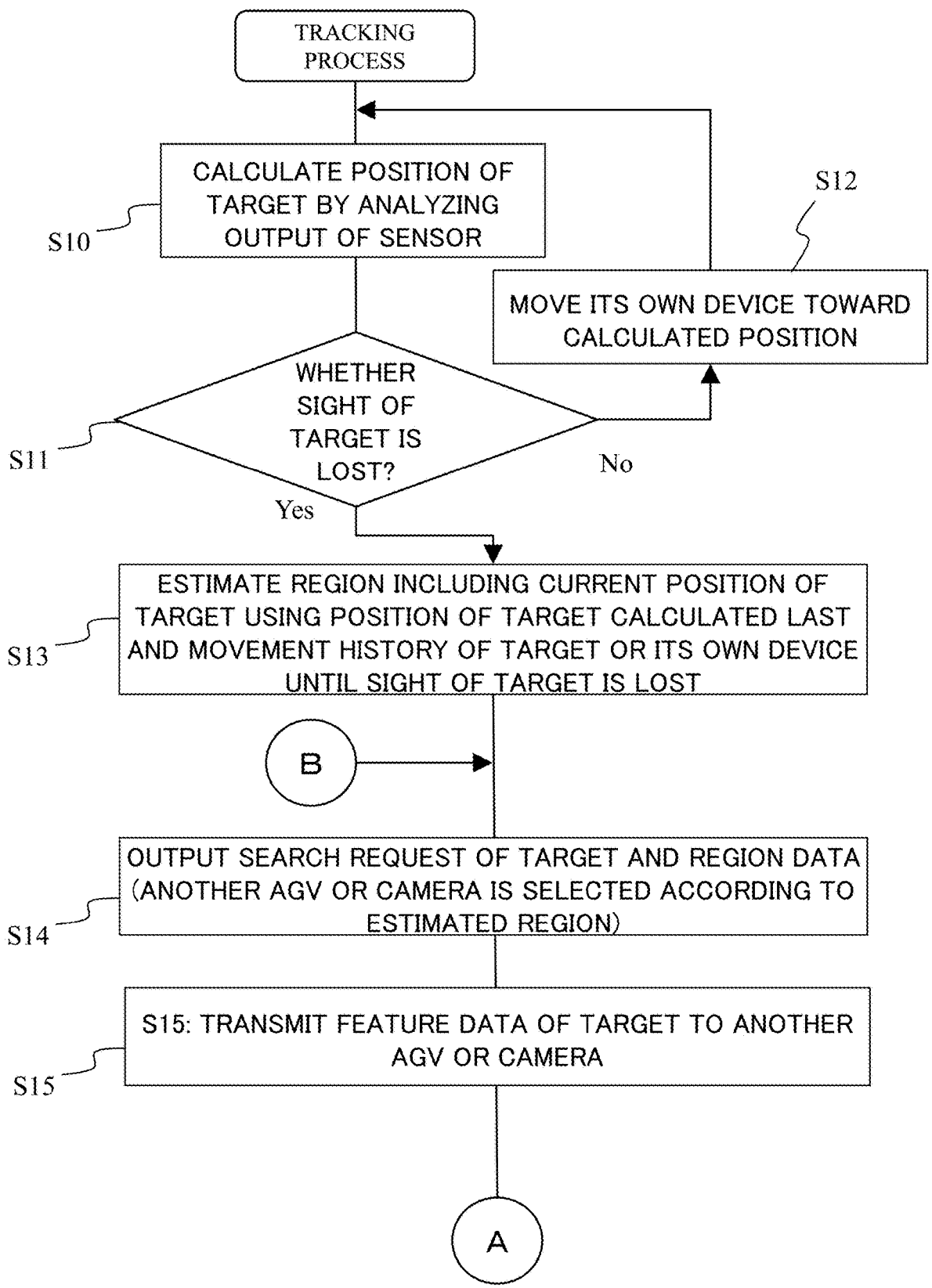
Figure 8B:
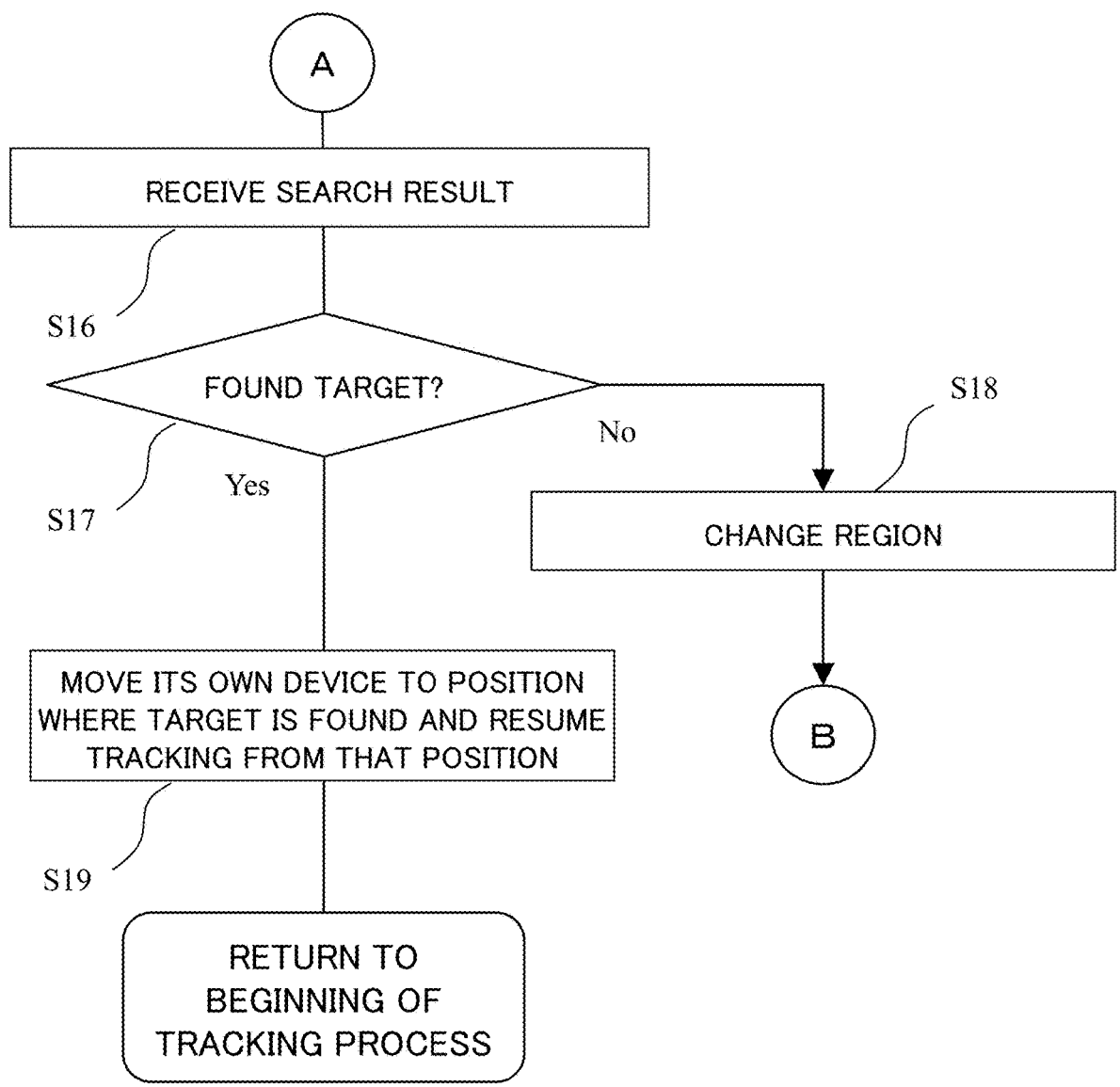

FIGS. 8A and 8B are flowcharts illustrating a procedure of processing of the microcomputer 14a.

In step S10, the microcomputer 14a calculates the position of the target by analyzing image and distance data output from the depth camera 15 which is a sensor.

In step S11, the microcomputer 14a determines whether the sight of the target has been lost. In the case in which the sight of the target is not lost, the process proceeds to step S12, and in the case in which the sight of the target is lost, the process proceeds to step S13.

In step S12, the microcomputer 14a outputs the PWM signal to the driving device 17 and causes its own device to travel toward the calculated position.

In step S13, the microcomputer 14a uses the position of the target, which is obtained by the last calculation and the movement history of the target or its own device until the sight of the target is lost, to estimate the search region R including a current position of the target.

In step S14, the microcomputer 14a outputs the search request and the region data of the target through the communication circuit 14d. Thereby, other AGVs or cameras are selected according to the estimated search region R, and the image-capturable region S or the partial region Sp.

In step S15, the microcomputer 14a transmits the feature data of the target to the selected other AGVs or cameras. Thereby, the microcomputer 14a may cause other AGVs or cameras, which have been selected, to determine the presence or absence of the object having features that match the feature data.

The process continues to "A" in FIG. 8B.

In step S16, the microcomputer 14a receives the search results transmitted from other AGVs or cameras.

In step S17, the microcomputer 14a determines whether the sight of the target has been found by referring to the search results. When the search results indicate the absence of the target, the process proceeds to step S18, and when the search results indicate the presence of the target, the process proceeds to step S19.

In step S18, the microcomputer 14a changes the search region R, and the image-capturable region S or the partial region Sp. The change of the search region R is a change that is required according to an increase in the elapsed time since the sight of the person 2 has been lost. The change of the image-capturable region S or the partial region Sp is a change associated with selecting a newly different image-capturable region or a partial region SP. Thereafter, the process returns to "B" in FIG. 8A, and the process after step S14 is performed again.

In step S19, the microcomputer 14a moves its own device to the position where the sight of the target is found, and resumes tracking of the target from the position. Since there is possibility that the target has moved while moving its own device to the position where the target is found, other AGVs or cameras may be caused to search for the target continuously.

Next, processing of the microcomputers of other AGVs or the microcomputers mounted on other cameras (sensing devices), which have received the search request, will be described with reference to FIG. 9.

Figure 9:
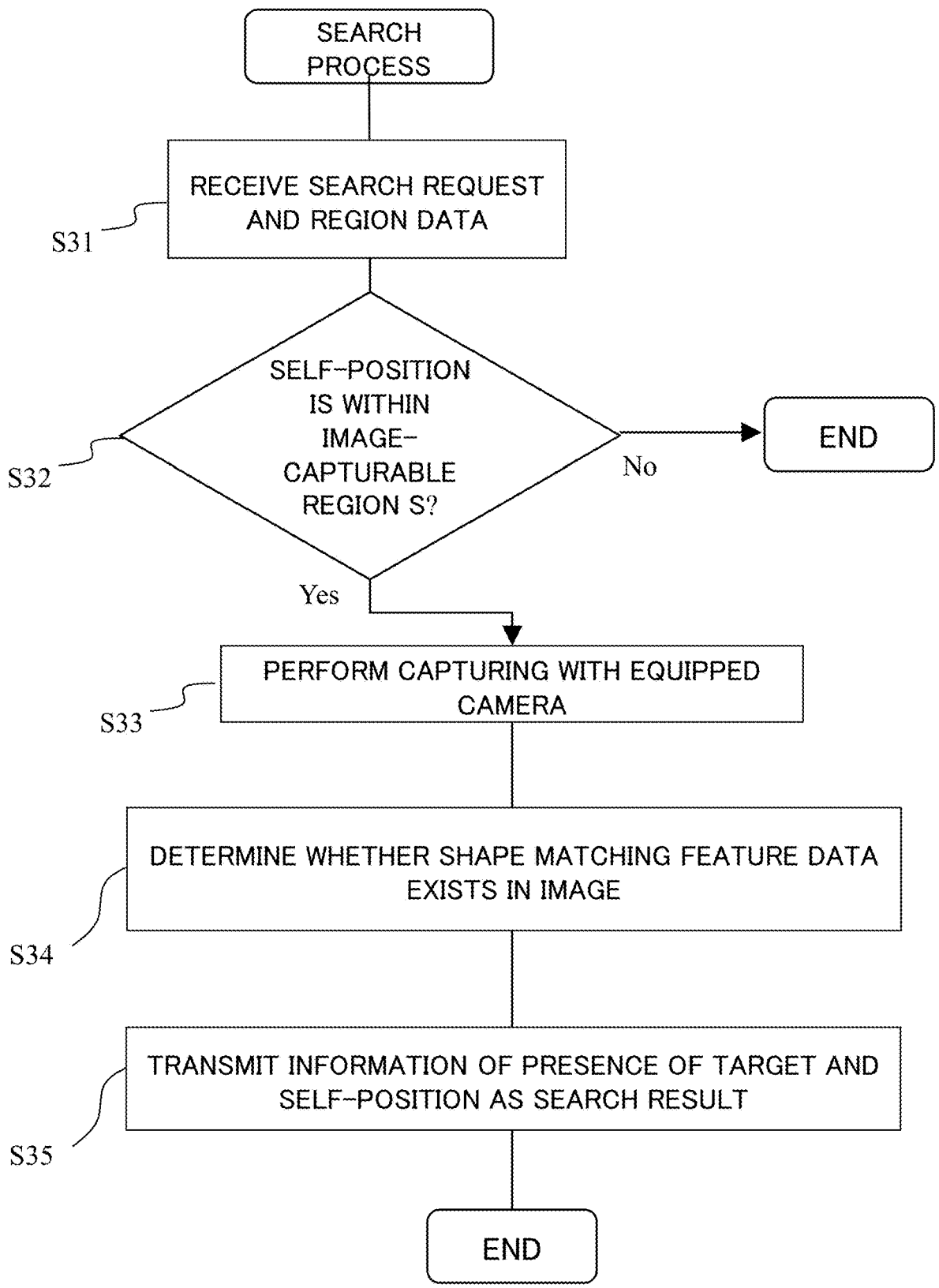
FIG. 9 is a flowchart illustrating a procedure of processing of a microcomputer of a sensing device that has received a search request.

FIG. 9 is a flowchart illustrating a procedure of processing of the microcomputer of the sensing device that has received the search request. The sensing device is an AGV. The AGV includes the hardware shown in FIG. 3. Thus, in the description below, the process of the AGV having the configuration shown in FIG. 3 will be described.

In step S31, the microcomputer 14a receives the search request and the region data through the communication circuit 14d.

In step S32, the microcomputer 14a determines whether the self-position is within the image-capturable region S. As a result of the determination, when it is determined that the self-position is within the image-capturable region S, the process proceeds to step S33, and when it is determined that the self-position is outside the image-capturable region S, the process ends. When the data specifying the partial region Sp is included as the region data, it may be determined whether the self-position is within the partial region Sp.

In step S33, the microcomputer 14a performs image capturing with the mounted depth camera 15. Further, in step S34, the microcomputer 14a determines whether there is a shape matching the feature data in the captured image.

In step S35, the microcomputer 14a transmits information on the presence of the target and the position of its own device as the search result to the AGV 10 that has transmitted the search request through the communication circuit 14d.

Heretofore, the example embodiments of the present disclosure have been described.

In the above description, the estimated movement distance of the target in which the sight thereof is lost was determined as a product of the moving speed of the target or AGV 10 and the elapsed time since the sight of the target has been lost. However, the search region R, the image-capturable region S, or the partial region Sp may be determined using an approximate value obtained by rounding up the obtained estimated movement distance by a 1 m unit, a 5 m unit, or a 10 m unit, instead of using the result of the calculation as it is.

In the above description, other AGVs or cameras, which have received the search request, determine whether there is a shape having the feature data matching the person 2 in the image. Other AGVs or cameras other than the AGV 10 may perform the determination to distribute the processing load of the AGV 10.

However, the microcomputer 14a of the AGV 10 may perform the determination instead of performing the determination by other AGVs or cameras. In that case, other AGVs or cameras transmit data of the captured images to the AGV 10. Since the microcomputer 14a of the AGV 10 receives image data from all other AGVs or cameras existing in the image-capturable region S or the partial region Sp, the processing loads is temporarily increased. However, since other AGVs or cameras need only to perform capturing the images and transmitting the image data, their own computing resources may be used for their own processing.

The present disclosure may be widely used for a moving body having a function of tracking a target.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A moving body configured to track a target in an indoor place and/or an outdoor place, the moving body comprising:
   a sensor to sense the target;
   a communication device;
   a processor;
   a storage device to store feature data indicating a feature of the target; and
   a non-tangible machine readable memory storing a computer program; wherein
   the processor executes the computer program to:
   calculate a last position of the target by analyzing an output of the sensor;
   estimate a search region in which the target is present by using a position of the target calculated when sight of the target is lost or a position obtained by analyzing the output of the sensor after losing the sight of the target, and a movement history of the target or the moving body until the sight of the target is lost;

instruct at least one sensing device, including the sensor, selected according to the search region to search for the target through the communication device; and receive a result of the search by the at least one sensing device through the communication device;

the sensor is in the moving body and is capable of acquiring an image of the search region within an image-capturable region;

the moving body is in the image-capturable region together with at least one additional moving body which is capable of acquiring an image of the search area;

the at least one sensing device includes a plurality of sensing devices, each of the plurality of sensing devices being respectively installed in the indoor place and/or the outdoor place, or attached to the at least one additional moving body;

each of the plurality of sensing devices includes a camera fixedly installed in the indoor place and/or the outdoor place or mounted on the at least one additional moving body, and the processor instructs the plurality of sensing devices to search for the target through one of the cameras installer in the indoor place and/der the outdoor place or mounted on the at least one additional moving body and receives the result of the search by the sensing device from the one of the cameras installed in the indoor place and/or the outdoor place or mounted on the at least one additional moving body the at least one additional moving body being in the image-capture region;

a result of the search includes sensor data acquired by sensing a space around the one of the cameras installed in the indoor place and/or the outdoor place or mounted on the at least one additional moving body and data of a position of the one of the cameras installed in the indoor place and/or the outdoor place or mounted on the at least one additional moving body; and the processor compares the feature data with the sensor data.

2. The moving body of claim 1, wherein the processor further transmits the feature data through the communication device and receives a result of the search performed with reference to the feature data from one of the cameras installed in the indoor place and/or the outdoor place or mounted on the at least one additional moving body.

3. The moving body of claim 2, wherein the processor estimates the search region in which the target is present using the position obtained by analyzing an output of at least one of the cameras after losing the sight of the target and the movement history of the target or the moving body until the sight of the target is lost.

4. The moving body of claim 1, wherein the result of the search performed with reference to the feature data from the one of the cameras installed in the indoor place and/or the outdoor place or mounted on the at least one additional moving body includes data of a position of the detected target or data of a position of the one of the cameras installed in the indoor place and/or the outdoor place or mounted on the at least one additional moving body that detected the target.

5. The moving body of claim 1, wherein the processor estimates the search region using the last position of the target calculated and a speed of the target or the moving body when the sight of the target is lost.

6. The moving body of claim 5, wherein the processor further estimates the search region using an elapsed time after losing the sight of the target.

7. The moving body of claim 6, wherein
the processor calculates a product of the moving speed of the target estimated from the movement history of the target or the moving body, and the elapsed time as an estimated movement distance; and
estimates a range within the estimated movement distance from a last calculated position of the target as the search region.

8. The moving body of claim 1, wherein the processor estimates the search region using a change in the position of the target or the moving body until the sight of the target is lost.

9. The moving body of claim 8, wherein the processor estimates a movement direction of the target from the change in the position of the target or the moving body until the sight of the target is lost and estimates a predetermined range including the movement direction as the search region.

10. The moving body of claim 1, wherein the processor further transmits region data designating the search region through the communication device, the one of the cameras installed in the indoor place and/or the outdoor place or mounted on the at least one additional moving body performs a search for the target according to a relationship between the designated region and a self-position, and the processor receives the result of the search through the communication device.

11. The moving body of claim 1, further comprising a storage device to maintain map data of the indoor place and/or the outdoor place; wherein the processor estimates the search region in which the target is present by further using the map data.

12. The moving body of claim 1, wherein the processor changes the search region when the result of the search by the sensing device indicates an absence of the target.

13. The moving body of claim 1, wherein when the result of the search by the sensing device indicates the presence of the target, the processor moves the moving body to a position at which the target was present and resumes tracking of the target from the position.

14. The moving body of claim 1, wherein the communication device performs communication using frequencies in the 2.4 GHz band.

* * * * *